(12) United States Patent
Lustiger et al.

(10) Patent No.: US 7,396,878 B2
(45) Date of Patent: Jul. 8, 2008

(54) POLYETHYLENE COMPOSITIONS FOR INJECTION MOLDING

(75) Inventors: Arnold Lustiger, Edison, NJ (US); David John Lohse, Bridgewater, NJ (US); Blair A. Graham, Bright's Grove (CA); Barry C. Trudell, Sarnia (CA)

(73) Assignee: ExxonMobil Chemical Patents Inc., Houston, TX (US)

( * ) Notice: Subject to any disclaimer, the term of this patent is extended or adjusted under 35 U.S.C. 154(b) by 475 days.

(21) Appl. No.: 11/186,185

(22) Filed: Jul. 21, 2005

(65) Prior Publication Data

US 2005/0256271 A1 Nov. 17, 2005

Related U.S. Application Data

(63) Continuation-in-part of application No. 10/666,114, filed on Sep. 18, 2003, now Pat. No. 7,022,770.

(60) Provisional application No. 60/424,535, filed on Nov. 7, 2002, provisional application No. 60/414,952, filed on Oct. 1, 2002.

(51) Int. Cl.
C08L 23/00 (2006.01)
C08L 23/04 (2006.01)

(52) U.S. Cl. .................... 525/191; 525/240

(58) Field of Classification Search .............. 525/191, 525/240
See application file for complete search history.

(56) References Cited

U.S. PATENT DOCUMENTS

| | | | |
|---|---|---|---|
| 3,974,114 A | 8/1976 | Sowa | |
| 4,330,639 A | 5/1982 | Matsuura et al. | |
| 4,335,224 A | 6/1982 | Matsuura et al. | |
| 4,336,352 A | 6/1982 | Sakurai et al. | |
| 4,429,079 A | 1/1984 | Shibata et al. | |
| 4,438,238 A | 3/1984 | Fukushima et al. | |
| 4,461,873 A | 7/1984 | Bailey et al. | |
| 4,536,550 A | 8/1985 | Moriguchi et al. | |
| 4,547,551 A | 10/1985 | Bailey et al. | |
| 4,577,768 A | 3/1986 | Go et al. | |
| 4,705,829 A | 11/1987 | Kwack et al. | |
| 4,770,912 A | 9/1988 | Furrer et al. | |
| 4,786,688 A | 11/1988 | Thiersault et al. | |
| 4,792,588 A | 12/1988 | Suga et al. | |
| 4,835,219 A | 5/1989 | Tajima et al. | |
| 5,015,511 A | 5/1991 | Treybig et al. | |
| 5,082,902 A | 1/1992 | Gurevitch et al. | |
| 5,189,106 A | 2/1993 | Morimoto et al. | |
| 5,260,384 A | 11/1993 | Morimoto et al. | |
| 5,306,775 A | 4/1994 | Martin et al. | |
| 5,317,051 A | 5/1994 | Harashige et al. | |
| 5,319,029 A | 6/1994 | Martin et al. | |
| 5,346,732 A | 9/1994 | Lai et al. | |
| 5,367,025 A | 11/1994 | Needham | |
| 5,380,803 A | 1/1995 | Coutant et al. | |
| 5,382,630 A | 1/1995 | Stehling et al. | |
| 5,382,631 A | 1/1995 | Stehling et al. | |
| 5,405,901 A | 4/1995 | Daniell et al. | |
| 5,519,091 A | 5/1996 | Tsutsui et al. | |
| 5,530,055 A | 6/1996 | Needham | |
| 5,589,128 A | 12/1996 | Lai et al. | |
| 5,605,969 A | 2/1997 | Tsutsui et al. | |
| 5,858,491 A | 1/1999 | Geussens et al. | |
| 6,111,023 A | 8/2000 | Chum et al. | |
| 6,136,924 A | 10/2000 | Promel | |
| 6,162,871 A | 12/2000 | Watanabe et al. | |
| 6,225,421 B1 | 5/2001 | Promel et al. | |
| 6,362,270 B1 | 3/2002 | Chaudhary et al. | |
| 6,806,338 B2 | 10/2004 | Baann et al. | |
| 6,969,741 B2 * | 11/2005 | Lustiger et al. | 525/240 |
| 7,022,770 B2 * | 4/2006 | Lustiger et al. | 525/191 |
| 2005/0215719 A1 * | 9/2005 | Lustiger et al. | 525/240 |
| 2005/0256266 A1 * | 11/2005 | Lustiger et al. | 525/191 |

FOREIGN PATENT DOCUMENTS

AU 19992 1280 9/1999

(Continued)

OTHER PUBLICATIONS

Dodge, Philip T., "Rotational Molding," *Encyclopedia of Polymer Science and Engineering*, vol. 14, pp. 659-670, 1990.

(Continued)

*Primary Examiner*—Nathan M Nutter

(57) ABSTRACT

Polyethylene blend compositions suitable for injection molding, injection molded articles, and processes for injection molding articles are provided. The polyethylene compositions include a first polyethylene having a melt index of 0.1 to 3.0 g/10 min and a density of from 0.905 to 0.938 g/cm$^3$; and a second polyethylene having a melt index of 10 to 500 g/10 min and a density of 0.945 to 0.975 g/cm$^3$. The compositions have a density of from 0.920 to 0.973 g/cm$^3$ and a melt index of 2 to 200 g/10 min, and the density of the second polyethylene is from 0.037 to 0.062 g/cm$^3$ greater than the density of the first polyethylene. The compositions exhibit improved physical properties, such as Environmental Stress Crack Resistance, relative to conventional compositions of similar melt index and density. In certain embodiments, the compositions, and articles produced therefrom, also exhibit an improved balance of toughness properties and processability properties.

21 Claims, 1 Drawing Sheet

FOREIGN PATENT DOCUMENTS

| | | |
|---|---|---|
| EP | 423 962 A2 | 4/1991 |
| EP | 0 614 938 | 9/1994 |
| EP | 0 869 146 | 10/1998 |
| EP | 1 201 711 A1 | 5/2002 |
| EP | 1 236 770 A1 | 9/2002 |
| EP | 1 304 353 | 4/2003 |
| JP | 2001-89615 | 5/2001 |
| WO | WO 00/71615 | 11/2000 |
| WO | 01/12714 | 2/2001 |
| WO | WO 01/96419 | 12/2001 |
| WO | WO 02/48258 A2 | 6/2002 |
| WO | 2004/031291 | 4/2004 |

OTHER PUBLICATIONS

Elvers, Barbara, et al., "Injection Molding," *Ullman's Encyclopedia of Industrial Chemistry*, vol. A20, pp. 688-696, 1992.

Fair, R. L., "Rotational Molding," *Modern Plastics Mid-October Encyclopedia*, vol. 66, No. 11, pp. 317-318, McGraw-Hill, Inc., 1990.

\* cited by examiner

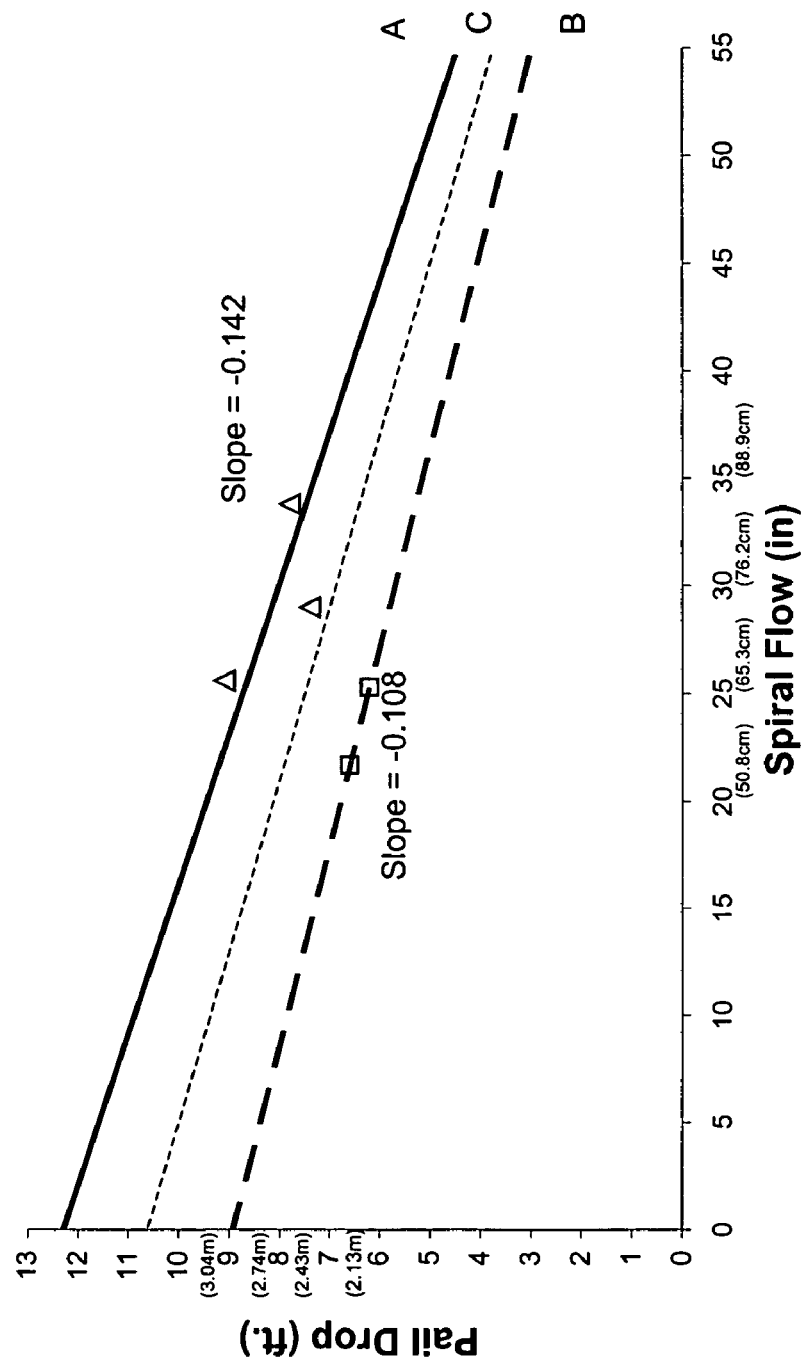

POLYETHYLENE COMPOSITIONS FOR INJECTION MOLDING

CROSS-REFERENCE TO RELATED APPLICATIONS

This application is a continuation-in-part of U.S. application Ser. No. 10/666,114, filed Sep. 18, 2003, now U.S. Pat. No. 7,022,770, which claims the benefit of U.S. Provisional Applications No. 60/414,952, filed Oct. 1, 2002 and 60/424,535, filed Nov. 7, 2002, said applications incorporated herein by reference.

FIELD OF THE INVENTION

This invention relates to thermoplastic compositions of polyethylene polymers suitable for fabrication into useful products by injection molding.

BACKGROUND OF THE INVENTION

Injection molding is the most important process for producing moldings from thermoplastics. This significance is due to the ability of injection molding to manufacture complex molding geometries in a single stage with high levels of reproducibility. Plastics finishing is largely unnecessary and a high degree of automation is possible. All manner of consumer goods and commodity articles are manufactured using injection molding of polyethylene thermoplastics.

To injection mold a part, polyethylene thermoplastic pellets, granules, or powders are melted and injected under pressure into the cavity of a mold where the melted resin is solidified by cooling for subsequent removal. More detailed discussion of injection molding may be found in Ullman's Encyclopedia of Industrial Chemistry, Vol. A20, Plastics Processing, pp. 688-696 (VCH Publishers, 1992).

Blends of polyethylene resins have been proposed to improve physical properties, including impact strength, toughness (pail drop), processability (spiral flow), environmental stress crack resistance (ESCR), and chemical resistance.

U.S. Pat. No. 4,438,238 describes blends for extrusion processing, injection molding and films, where a combination of two ethylene-α-olefin copolymers with different densities, intrinsic viscosities and number of short chain branching per 1,000 carbon atoms is attributed with such physical properties.

U.S. Pat. No. 4,461,873 describes ethylene polymer blends of a high molecular weight ethylene polymer, preferably a copolymer, and a low molecular weight ethylene polymer, preferably an ethylene homopolymer, for improved film properties and ESCR, useful in the manufacture of film, in blow molding techniques, or in the production of pipes and wire coating.

EP 0 423 962 describes ethylene polymer compositions particularly suitable for gas pipes, said to have improved ESCR, comprising two or more kinds of ethylene polymers different in average molecular weight, at least one of which is a high molecular weight ethylene polymer having an intrinsic viscosity of 4.5 to 10.0 dl/g in decalin at 135° C. and a density of 0.910 to 0.930 g/cm$^3$, and another of which is a low molecular weight ethylene polymer having an intrinsic viscosity of 0.5 to 2.0 dl/g, as determined for the first polymer, and a density of 0.938 to 0.970 g/cm$^3$.

U.S. Pat. No. 5,082,902 describes blends of linear polyethylenes for injection and rotational molding said to have reduced crystallization times with improved impact strength and ESCR. The blends comprise: (a) a first polymer having a density of from 0.85 to 0.95 g/cm$^3$ and a melt index (MI) of 1 to 200 g/10 min; and (b) a second polymer having a density of 0.015 to 0.15 g/cm$^3$ greater that the density of the first polymer and an MI differing by no more that 50% from the MI of the first polymer.

U.S. Pat. No. 5,306,775 describes polyethylene blends said to have a balance of properties for processing by any of the known thermoplastic processes, specifically including improved ESCR. These compositions have: (a) low molecular weight ethylene resins made using a chromium oxide-based catalyst and having a density at least 0.955 g/cm$^3$ and MI between 25 and 400 g/10 min and (b) high molecular weight ethylene copolymer resins with a density not higher than 0.955 g/cm$^3$ and a high load melt index (HLMI) between 0.1 and 50 g/10 min.

U.S. Pat. No. 5,382,631 describes linear interpolymer polyethylene blends having molecular weight distribution $(M_w/M_n) \leq 3$ and composition distribution (CDBI)$\leq$50%, where the blends are generally free of fractions having higher molecular weight and lower average comonomer contents than other blend components. Improved properties for films, fibers, coatings, and molded articles are attributed to these blends. In one example, a first component is an ethylene-butene copolymer with a density of 0.9042 g/cm$^3$, $M_w/M_n$ of 2.3, and an MI of 4.0 dg/min and a second component is a high density polyethylene (HDPE) with a density of 0.9552 g/cm$^3$, $M_w/M_n$ of 2.8, and an MI of 5.0 dg/min. The blend is ascribed with improved tear strength characteristics.

There is a continuing need for polyethylene-based compositions having improved environmental stress cracking resistance, particularly those suitable for injection molding applications.

SUMMARY OF THE INVENTION

In accordance with the present invention, polyolefin-based blend compositions suitable for injection molding, injection molded articles, and processes for injection molding articles are provided.

In one embodiment, the invention provides a polyethylene composition including a first polyethylene having a melt index ($I_{2.16}$) of 0.3 to 3.0 g/10 min and a density of from 0.905 to 0.938 g/cm$^3$; and a second polyethylene having a melt index of 10 to 500 g/10 min and a density of 0.945 to 0.975 g/cm$^3$, wherein the composition has a density of from 0.920 to 0.973 g/cm$^3$ and a melt index of 2 to 200 g/10 min, and wherein the density of the second polyethylene is from 0.037 to 0.062 g/cm$^3$ greater than the density of the first polyethylene. In a particular aspect of this embodiment, the first polyethylene is a metallocene-catalyzed polyethylene. In another particular aspect of this embodiment, both the first and the second polyethylenes are metallocene-catalyzed polyethylenes.

In another embodiment, the invention provides an injection molded article formed from or including a polyethylene composition, the polyethylene composition including a first polyethylene having a melt index of 0.3 to 3.0 g/10 min and a density of from 0.905 to 0.938 g/cm$^3$; and a second polyethylene having a melt index of 10 to 500 g/10 min and a density of 0.945 to 0.975 g/cm$^3$, wherein the composition has a density of from 0.920 to 0.973 g/cm$^3$ and a melt index of 2 to 200 g/10 min, and wherein the density of the second polyethylene is from 0.037 to 0.062 g/cm$^3$ greater than the density of the first polyethylene. In a particular aspect of this embodiment, the first polyethylene is a metallocene-catalyzed polyethylene. In another particular aspect of this embodiment, both the first and the second polyethylenes are metallocene-catalyzed polyethylenes.

In another embodiment, the invention provides a process for forming an injection molded article, the process carried out by: (a) providing a polyethylene composition, the polyethylene composition including a first polyethylene having a melt index of 0.3 to 3.0 g/10 min and a density of from 0.905 to 0.938 g/cm$^3$; and a second polyethylene having a melt index of 10 to 500 g/10 min and a density of 0.945 to 0.975 g/cm$^3$, wherein the composition has a density of from 0.920 to 0.973 g/cm$^3$ and a melt index of 2 to 200 g/10 min, and wherein the density of the second polyethylene is from 0.037 to 0.062 g/cm$^3$ greater than the density of the first polyethylene; and (b) injection molding the composition to form an injection molded article. In a particular aspect of this embodiment, the first polyethylene is a metallocene-catalyzed polyethylene. In another particular aspect of this embodiment, both the first and the second polyethylenes are metallocene-catalyzed polyethylenes.

In another embodiment, the invention provides a polyethylene composition, an injection molded article, or a process of forming an injection molded article, in accordance with any of the preceding embodiments, except that the metallocene catalyzed polyethylene has an Mw/Mn ratio of from 1.4 to 4.0.

In another embodiment, the invention provides a polyethylene composition, an injection molded article, or a process of forming an injection molded article, in accordance with any of the preceding embodiments, except that the metallocene catalyzed polyethylene has an Mw/Mn ratio of from 1.8 to 3.5.

In another embodiment, the invention provides a polyethylene composition, an injection molded article, or a process of forming an injection molded article, in accordance with any of the preceding embodiments, except that the first polyethylene has a density of from 0.910 to 0.935 g/cm$^3$.

In another embodiment, the invention provides a polyethylene composition, an injection molded article, or a process of forming an injection molded article, in accordance with any of the preceding embodiments, except that the first polyethylene has a melt index of 0.1 to 2.0 g/10 min.

In another embodiment, the invention provides a polyethylene composition, an injection molded article, or a process of forming an injection molded article, in accordance with any of the preceding embodiments, except that the first polyethylene has a melt index of 0.1 to 1.0 g/10 min.

In another embodiment, the invention provides a polyethylene composition, an injection molded article, or a process of forming an injection molded article, in accordance with any of the preceding embodiments, except that the first polyethylene has a melt index of 0.3 to 1.0 g/10 min.

In another embodiment, the invention provides a polyethylene composition, an injection molded article, or a process of forming an injection molded article, in accordance with any of the preceding embodiments, except that the second polyethylene has a density of from 0.950 to 0.972 g/cm$^3$.

In another embodiment, the invention provides a polyethylene composition, an injection molded article, or a process of forming an injection molded article, in accordance with any of the preceding embodiments, except that the second polyethylene has a density of from 0.955 to 0.970 g/cm$^3$.

In another embodiment, the invention provides a polyethylene composition, an injection molded article, or a process of forming an injection molded article, in accordance with any of the preceding embodiments, except that the second polyethylene has a density of from 0.960 to 0.968 g/cm$^3$.

In another embodiment, the invention provides a polyethylene composition, an injection molded article, or a process of forming an injection molded article, in accordance with any of the preceding embodiments, except that the second polyethylene has a melt index of 10 to 300 g/10 min.

In another embodiment, the invention provides a polyethylene composition, an injection molded article, or a process of forming an injection molded article, in accordance with any of the preceding embodiments, except that the second polyethylene has a melt index of 30 to 200 g/10 min.

In another embodiment, the invention provides a polyethylene composition, an injection molded article, or a process of forming an injection molded article, in accordance with any of the preceding embodiments, except that the second polyethylene has a melt index of 50 to 100 g/10 min.

In another embodiment, the invention provides a polyethylene composition, an injection molded article, or a process of forming an injection molded article, in accordance with any of the preceding embodiments, except that the composition has a density of from 0.930 to 0.970 g/cm$^3$.

In another embodiment, the invention provides a polyethylene composition, an injection molded article, or a process of forming an injection molded article, in accordance with any of the preceding embodiments, except that the composition has a density of from 0.940 to 0.965 g/cm$^3$.

In another embodiment, the invention provides a polyethylene composition, an injection molded article, or a process of forming an injection molded article, in accordance with any of the preceding embodiments, except that the composition has a density of from 0.950 to 0.960 g/cm$^3$.

In another embodiment, the invention provides a polyethylene composition, an injection molded article, or a process of forming an injection molded article, in accordance with any of the preceding embodiments, except that the density of the second polyethylene is from 0.038 to 0.062 g/cm$^3$ greater than the density of the first polyethylene.

In another embodiment, the invention provides a polyethylene composition, an injection molded article, or a process of forming an injection molded article, in accordance with any of the preceding embodiments, except that the density of the second polyethylene is from 0.040 to 0.060 g/cm$^3$ greater than the density of the first polyethylene.

In another embodiment, the invention provides a polyethylene composition, an injection molded article, or a process of forming an injection molded article, in accordance with any of the preceding embodiments, except that the composition has a melt index $I_{2.16}$ of from 3 to 100 g/10 min.

In another embodiment, the invention provides a polyethylene composition, an injection molded article, or a process of forming an injection molded article, in accordance with any of the preceding embodiments, except that the composition has a melt index $I_{2.16}$ of from 3 to 50 g/10 min.

In another embodiment, the invention provides a polyethylene composition, an injection molded article, or a process of forming an injection molded article, in accordance with any of the preceding embodiments, except that the composition has a melt index $I_{2.16}$ of from 4 to 30 g/10 min.

In another embodiment, the invention provides a polyethylene composition, an injection molded article, or a process of forming an injection molded article, in accordance with any of the preceding embodiments, except that the composition has a melt index $I_{2.16}$ of from 4 to 10 g/10 min.

In another embodiment, the invention provides a polyethylene composition, an injection molded article, or a process of forming an injection molded article, in accordance with any of the preceding embodiments, wherein the blend includes 80% to 20% by weight of the first polyethylene and 20% to 80% by weight of the second polyethylene, based on the total weight of the first and second polyethylenes.

In another embodiment, the invention provides a polyethylene composition, an injection molded article, or a process of forming an injection molded article, in accordance with any of the preceding embodiments, wherein the blend includes 70% to 30% by weight of the first polyethylene and 30% to 70% by weight of the second polyethylene, based on the total weight of the first and second polyethylenes.

In another embodiment, the invention provides a polyethylene composition, an injection molded article, or a process of forming an injection molded article, in accordance with any of the preceding embodiments, wherein the blend includes 60% to 40% by weight of the first polyethylene and 40% to 60% by weight of the second polyethylene, based on the total weight of the first and second polyethylenes.

In another embodiment, the invention provides a polyethylene composition, an injection molded article, or a process of forming an injection molded article, in accordance with any of the preceding embodiments, wherein at least one of the first and second polyethylenes is a blend of two or more polyethylene resins.

In certain embodiments, the invention provides a polyethylene composition, an injection molded article, or a process of forming an injection molded article, in accordance with any of the preceding embodiments, wherein the article has an ESCR of at least 10 hrs.

The compositions described herein, and articles produced therefrom, may also exhibit beneficial toughness and processability properties. In certain embodiments, the compositions and articles produced therefrom exhibit a high degree of toughness as determined by pail drop values and also a high degree of processability as determined by spiral flow values.

In another embodiment, the invention provides a polyethylene composition, an injection molded article, or a process of forming an injection molded article, in accordance with any of the preceding embodiments except the immediately preceding embodiment, wherein the composition includes only the first and second polyethylenes, except that minor amounts of conventional additives can also be present.

BRIEF DESCRIPTION OF THE DRAWING

A more complete appreciation of the invention will be readily obtained by reference to the following detailed description when considered in connection with the following drawing in which:

FIG. 1 is a plot of the pail drop and spiral flow values reported in Table 2.

DETAILED DESCRIPTION OF THE INVENTION

The inventive compositions surprisingly and advantageously provide improved ESCR for polyethylene injection molding applications, relative to compositions having the same melt index and density. Additionally, the compositions described herein surprisingly and advantageously provide improved toughness versus processability. In certain embodiments, the improved toughness and processability properties are exhibited while in conjunction with improved ESCR for polyethylene injection molding applications, relative to compositions having the same melt index and density.

By preparing several samples of proposed blend polyethylene components and then subjecting blends prepared from them to analytical testing, it was determined that peak values of ESCR, and improved balance of toughness and processability are obtained when the melt index ($I_{2.16}$) and the difference in density and of the blend components were within specific ranges, as described herein. At smaller density differences for the two components, ESCR was improved over single component compositions, but was significantly deficient to those within the range for the inventive compositions. Increasing the width of the density range between the components within the invention range increased the ESCR improvement until a peak was reached in which ESCR no longer improved and began to diminish. Examining the melting peaks of the sample blends with a differential scanning calorimeter (DSC) helps illustrate the region in which ESCR improvements are no longer realized by increasing the difference in densities between the two components. This is shown by the point where by further increasing the width of the density range, the two components no longer completely cocrystallize, as evidenced by the presence of a secondary lower melting peak in the DSC scan. When the density range was wider than that described above, evidence of loss of cocrystallizability became apparent as a second melting peak or shoulder began to appear in the scans. The blends exhibiting even minimal incidence of a second shoulder had diminished ESCR improvements.

The first polyethylene of the polymer blends of the invention is a polyethylene copolymer derived from the coordination polymerization of principally ethylene with a minor amount of one or more copolymerizable monomers. Particularly improved end-product properties are obtained using such copolymers having a narrow molecular weight distribution (Mw/Mn, or "MWD"), e.g., Mw/Mn of from a lower limit of 1.4 or 1.6 or 1.8 or 2.0 to an upper limit of 4.0 or 3.8 or 3.5 or 3.0, with ranges from any lower limit to any upper limit being contemplated. Suitable comonomers include $C_3$-$C_{20}$ alpha-olefins, preferably $C_3$-$C_8$, $C_5$-$C_{20}$ cyclic olefins, preferably $C_7$-$C_{12}$ cyclic olefins, $C_7$-$C_{20}$ vinyl aromatic monomers, preferably styrene, and $C_4$-$C_{20}$ geminally disubstituted olefins, preferably isobutylene. The most preferred comonomers include propylene, 1-butene, 1-hexene, 4-methyl-1-pentene and 1-octene. The density of the copolymer is determined largely by comonomer content and typically ranges from 0.905 or 0.910 g/cm³ to 0.938 or 0.935 g/cm³, with ranges from any lower limit to any upper limit being contemplated. Some amount of long-chain branching may be present, but the density limitations are largely due to the presence of comonomer. These ethylene copolymers are of higher molecular weight than the second polyethylene of the blends, as shown by a melt index $I_{2.16}$ as measured according to ASTM D1238, condition 190° C. 2.16 kg (formerly condition "E"), of from 0.1 or 0.3 to 3.0 or 2.0 or 1.0 g/10 min, with ranges from any lower limit to any upper limit being contemplated.

The second polyethylene of the polymer blends of the invention has a higher density and a lower molecular weight than the first polyethylene. The second polyethylene can be derived from ethylene and, optionally, minor amounts of any of the comonomers listed above for the first polyethylene. The density can be from a lower limit of 0.945 or 0.950 or 0.955 or 0.960 g/cm³ to an upper limit of 0.975 or 0.972 or 0.970 or 0.968 g/cm³, with ranges from any lower limit to any upper limit being contemplated. It should be appreciated that, the specific choice of densities must be consistent with the density differences described herein. The melt index $I_{2.16}$ of the second polyethylene, as measured according to ASTM D1238, condition 190° C., 2.16 kg, can be from a lower limit of 10 or 30 or 50 to an upper limit of 500 or 300 or 200 or 100 g/10 min, with ranges from any lower limit to any upper limit being contemplated. The second polyethylene can be any conventional polyethylene having the properties described herein, and can have a broad or narrow molecular weight distribution. In a particular embodiment, the second polyethylene has a value of Mw/Mn of from a lower limit of 1.4 or 1.6 or 1.8 or 2.0 to an upper limit of 4.0 or 3.8 or 3.5 or 3.0, with ranges from any lower limit to any upper limit being contemplated.

Industrial methods of producing the polyethylene components of the invention are well known in the art as is exemplified in the references cited above. Any such method capable of producing polyethylene polymer components according to the invention will be suitable. Such methods include gas phase, liquid phase (or solution), and slurry phase polymerization processes, either alone or in combination. By alone, reference is made to series or serial production in a single reactor or in more than one reactor. Reactor blends will also be suitable, such as by the use of mixed catalysts or mixed polymerization conditions in a single reactor. Gas phase processes are particularly suited in view of economic advantages. Such processes use supported catalysts and are conducted in polymerization reactors under gas phase conditions suitable for linear low density ethylene copolymers prepared by coordination polymerization. Illustrative examples may be found in U.S. Pat. Nos. 4,543,399; 4,588,790; 5,028,670; 5,352,749; 5,382,638; 5,405,922; 5,422,999; 5,436,304; 5,453,471; 5,462,999; and 5,463,999; and International applications WO 94/28032, WO 95/07942, and WO 96/00245. These processes use either traditional Ziegler-Natta catalysts or later organometallic catalysts characterized as having essentially single polymerization sites due to the arrangement of ancillary ligands on or about the metal center. Metallocene catalysts are representative "single site catalysts" and are preferred in this invention in embodiments having narrow molecular weight distribution polyolefins. Typically, the processes are conducted at temperatures of from about −100° C. to 150° C., more typically from about 40° C. to 120° C., at pressures up to about 7000 kPa, typically from about 690 kPa to 2415 kPa. Continuous processes using fluidized beds and recycle streams as the fluidizing medium are preferred.

Slurry polymerization processes are suitable for both components and particularly suited for the high density components of the invention. These processes are typically described as those in which the polymerization medium can be either a liquid monomer, like propylene, or a hydrocarbon solvent or diluent, advantageously aliphatic paraffin such as propane, isobutane, hexane, heptane, cyclohexane, etc., or an aromatic one such as toluene. Slurry solids typically include the forming polymer and inert carrier-supported catalysts. Catalysts are typically Ziegler-Natta, and/or one or more single site catalysts, such as metallocenes. The polymerization temperatures may be those considered low, e.g., less than 50° C., typically 0° C.-30° C., or may be in a higher range, such as up to about 150° C., typically from 50° C. up to about 80° C., or at any ranges between the end points indicated. Pressures can vary from about 100 to about 700 psia (0.76-4.8 MPa). Additional description is given in U.S. Pat. Nos. 4,182,810; 5,274,056; 6,319,997; 6,380,325; 6,420,497; WO 94/21962; and WO 99/32531.

The polyethylene blend compositions in accordance with the present invention can include the first polyethylene in an amount of from a lower limit of 20 or 30 or 40 wt % to an upper limit of 80 or 70 or 60 wt %, based on the total weight of the first and second polyethylenes, with ranges from any lower limit to any upper limit being contemplated. Similarly, the polyethylene blend compositions in accordance with the present invention can include the second polyethylene in an amount of from a lower limit of 20 or 30 or 40 wt % to an upper limit of 80 or 70 or 60 wt %, based on the total weight of the first and second polyethylenes, with ranges from any lower limit to any upper limit being contemplated.

Additionally, either or both of the first polyethylene and the second polyethylene can be a sub-blend of two or more polyethylenes so long as the sub-blend has the properties described herein.

Although the description herein focuses on first and second polyethylenes, in some embodiments, the polyethylene blend composition can further include additional polymeric components, including additional polyethylenes, provided that the overall blend composition has the recited properties.

The weight percentages recited herein for the first and second polyethylene components are based on the total weight (100%) of the first and second polyethylene components.

The blend can have a density of from a lower limit of 0.920 or 0.930 or 0.940 or 0.950 g/cm$^3$ to an upper limit of 0.973 or 0.970 or 0.965 or 0.960 g/cm$^3$, with ranges from any lower limit to any upper limit being contemplated.

The blend can have a difference in the density of the first and second polyethylenes, with the density of the second polyethylene being greater, of from a lower limit of 0.037 or 0.038 or 0.040 g/cm$^3$ to an upper limit of 0.062 or 0.060 g/cm$^3$, with ranges from any lower limit to any upper limit being contemplated.

The melt index $I_{2.16}$ of the blend can be from a lower limit of 2 or 3 or 4 g/10 min to an upper limit of 200 or 100 or 50 or 30 or 10/10 min.

The first and second polyethylenes have weight average molecular weights $Mw_1$ and $Mw_2$, respectively, conforming to the relationship $$\frac{Mw_1}{Mw_2} > 1.$$

The densities of the first and second polyethylenes, $\rho_1$ and $\rho_2$, respectively, conform to the relationship $$\frac{\rho_1}{\rho_2} < 1.$$

It is well-known in the art that, all other factors being equal, ESCR is inversely proportional to density, and inversely proportional to melt index. It has been surprisingly found that polyethylene blend compositions of the invention show an improved balance of processability and toughness as well as improved ESCR values than those of conventional compositions having the same density and melt index, but not having the inventive combination of properties described herein, such as melt indexes, densities, and density differences.

In certain embodiments, compositions described herein provide a polyethylene composition, an injection molded article, or a process of forming an injection molded article, in accordance with any of the preceding embodiments, wherein the article has an ESCR of at least 10 hrs. All ESCR values referred to hereinafter are $F_{50}$ values as determined by ASTM 1693, Condition B. In other embodiments, the compositions described herein provide a polyethylene composition, an injection molded article, or a process of forming an injection molded article, in accordance with any of the preceding embodiments, wherein the article has an ESCR of at least 30 hrs. In still other embodiments, the compositions described herein provide a polyethylene composition, an injection molded article, or a process of forming an injection molded article, in accordance with any of the preceding embodiments, wherein the article has an ESCR of at least 100 hrs. In certain additional embodiments, the ESCR for an article produced from the compositions described herein and is from about 100 hrs to about 1,000 hrs. In other embodiments, the ESCR is from about 200 hrs to about 800 hrs. In still other embodiments, the ESCR is from about 400 hrs to about 800 hrs.

It is significant to note that in many embodiments, higher ESCR values are obtained for the compositions described herein as compared to conventional polymeric materials having comparable melt index and density values.

The compositions described herein, and articles produced therefrom, may also exhibit beneficial toughness and processability properties. In certain embodiments, the compositions and articles exhibit a high degree of toughness as determined by pail drop values and also a high degree of processability as determined by spiral flow values.

Pail drop values represent toughness. Pail drop values are reported in feet (meters) and are $F_{50}$ values, meaning a value is the height at which 50% of pails produced from a given composition fail upon dropping from the height. Pails made from the tested composition are filled with ethylene glycol and cooled to minus 20° C. for 48 hrs. and then dropped flat on their bottoms using a Bruceton staircase method to determine the drop heights. The pails had 5-gallon (18.9 liters) capacities with wall thicknesses of 90 mils (2.25 mm) to 100 mils (2.5 mm). Twenty pails are dropped to determine a pail drop value.

Spiral flow values are reported in inches (centimeters). The larger the value, the better the processability of the composition. The tests are conducted on a 225-ton (204.1 metric tons) Husky injection molding machine at 8.96 MPa injection pressure. Shot size is 20 mm, hold time is 5 seconds, and injection time is 1.8 seconds. Melt profile is flat at 200° C.

In certain embodiments, pail drop values for pails produced from at least two different compositions described herein exhibit a relationship to the corresponding spiral flow values for the compositions used to produce the pails that may be represented graphically with a trendline, determined by linear regression analysis, for the intercept points of corresponding pail drop and spiral flow values of the at least two different compositions. The line may be defined by the equation: $y=mx+b$, wherein y is pail drop, x is spiral flow, m is the slope of the line, and b is the y intercept of the line.

In certain embodiments, with respect to at least two compositions described herein having different pail drop values falling with the range of about 7 feet to about 10 feet (2.13 m to 3.04 m), the relationship between the pail drop values and the corresponding spiral flow values is represented by a line in which the slope (m) ranges from about −0.140 to about −0.170 (−0.0154 to −0.0189), b is at least 10 feet (3.04 m). In other embodiments, with respect to at least two compositions described herein having different pail drop values falling with the range of about 7 feet to about 10 feet (2.13 m to 3.04 m), the relationship between the pail drop values and the corresponding spiral flow values is represented by a line in which the slope (m) ranges from −0.140 to −0.170, b is at least 11 feet (3.35 m). In additional embodiments, with respect to at least two compositions described herein having different pail drop values falling with the range of about 7 feet to about 10 feet (2.13 m to 3.04 m), the relationship between the pail drop values and the corresponding spiral flow values is represented by a line in which the slope (m) ranges from −0.140 to −0.170, b is at least 12 feet (3.65 m). In still other embodiments, with respect to at least two compositions described herein having different pail drop values falling with the range of about 7 feet to about 10 feet (2.13 m to 3.04 m), the relationship between the pail drop values and the corresponding spiral flow values is represented by a line in which the slope (m) ranges from −0.140 to −0.170, b is at least 13 feet (3.96 m).

In certain embodiments, the compositions described herein, and the articles produced therefrom, exhibit a balance of toughness and processability defined by pail drop values of at least 7 feet (2.13 m) and spiral flow values of at least 35 inches (88.9 cm). In other embodiments, the compositions described herein, and the articles produced therefrom, exhibit a balance of toughness and processability defined by pail drop values of at least 8 feet (2.43 m) and spiral flow values of at least 30 inches (76.2 cm). In additional embodiments, the compositions described herein, and the articles produced therefrom, exhibit a balance of toughness and processability defined by pail drop values of at least 9 feet (2.74 m) and spiral flow values of at least 25 inches (65.3 cm). In other embodiments, the compositions described herein, and the articles produced therefrom, exhibit a balance of toughness and processability defined by pail drop values of at least 10 feet (3.04 m) and spiral flow values of at least 15 inches (38.1 cm). In other embodiments, the compositions described herein, and the articles produced therefrom, exhibit a balance of toughness and processability defined by pail drop values of at least 11 feet (3.35 m) and spiral flow values of at least 10 inches (25.4 cm).

In still other embodiments, the compositions described herein and the articles produced therefrom, exhibit a balance of toughness and processability defined by pail drop values of at least 7 feet (2.13 m) and spiral flow values of at least 30 inches (76.2 cm). In other embodiments, the compositions described herein and the articles produced therefrom, exhibit a balance of toughness and processability defined by pail drop values of at least 8 feet (2.43 m) and spiral flow values of at least 20 inches (50.8 cm). In additional embodiments, the compositions described herein and the articles produced therefrom, exhibit a balance of toughness and processability defined by pail drop values of at least 9 feet (2.74 m) and spiral flow values of at least 15 inches (38.1 cm). In still other embodiments, the compositions described herein and the articles produced therefrom, exhibit a balance of toughness and processability defined by pail drop values of at least 10 feet (3.04 m) and spiral flow values of at least 5 inches (12.7 cm).

Based upon the various properties, parameters, and relationships described above, the composition described herein may be selected to increase production and/or decrease cost by varying certain known relationships, while maintaining acceptable quality control. For example, it is known that decreasing the wall thickness of an article decreases the toughness (pail drop) of that article. Additionally, it is known improving the processability of an article decreases the cycle time.

Cycle time is the total time required to produce an article. In the case or producing a pail or other article by injection molding, cycle time is the time that elapses from mold closure to ejection of the article. Reducing cycle time allows more articles to be produced per unit of time, thereby increasing efficiency.

In certain embodiments, with the compositions described herein, it may be possible to decrease the wall thickness of an article from about 5% to about 10% to reduce the cost of materials while producing an article having a commercially acceptable toughness, with increased processability and increased ESCR. The increased processability will result in a decreased cycle time. In certain embodiments, the compositions described make it possible to produce articles in injection molding processes with cycle times that are 10 to 20 percent less than the cycle times of comparative articles produced from conventional polymeric materials. In other embodiments, the compositions described herein make it possible to produce articles in injection molding processes with cycle times that are 15 to 20 percent less than the cycle times of comparative articles produced from conventional polymeric materials.

Other variations of these parameters i.e., overall polymer density, component density and proportion, wall thickness, cycle time, ESCR, pail drop, and spiral flow may be undertaken to optimize overall production efficiency.

Additives may be used as needed. Typical additives include one or more of antioxidants, anti-static agents, UV stabilizers, foaming agents, processing aids, nucleating agents, nanocomposites, fiber reinforcements and pigments. Illustrative pigments or colorants include titanium dioxide, carbon black, cobalt aluminum oxides such as cobalt blue, and chromium oxides such as chromium oxide green, and pigments such as ultramarine blue, which is a silicate. Phthalocyanine blue and iron oxide red will also be suitable. Such are typically used in amounts from 0 wt % to not more than about 15 wt %, based on the total weight of the first and second polyethylene components.

EXAMPLES

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975), pp. 287-368; Rodriguez, F., *Principles of Polymer Systems* 3 rd ed., Hemisphere Pub. Corp., NY, (1989), pp. 155-160; U.S. Pat. No. 4,540,753; Verstrate et al., *Macromolecules*, Vol. 21, (1988), pg. 3360; and references cited therein.

Environmental Stress Crack Resistance (ESCR) (bent strip) is determined in accordance with ASTM D-1693, Condition B, 10% IGEPAL™. IGEPAL™ is a nonylphenoxy poly(ethylenoxy)ethanol surfactant available from Rhone Polenc, Cranbury, N.J. All ESCR values cited herein are ASTM D-1693 Condition B, 10% IGEPAL™ F50 values, and are given in units of hrs.

Polymer density (g/cm³) is determined using a compression molded sample, cooled at 15° C. per hour and conditioned for 40 hrs. at room temperature according to ASTM D1505-68 and ASTM D1928, procedure C.

Polymer melt flow rates can be determined at 190° C. according to ASTM D-1238. $I_{21.6}$ is the "flow index" or melt flow rate of the polymer measured according to ASTM D-1238, condition 190° C., 21.6 kg, and $I_{2.16}$ is the "melt index" or melt flow rate of the polymer measured according to ASTM D-1238, condition 190° C., 2.16 kg. The ratio of $I_{21.6}$ to $I_{2.16}$ is the "melt flow ratio" or "MFR". The melt flow rate $I_{21.6}$ is also sometimes termed the "high load melt index" or HLMI. Melt flow rates are reported in units of grams per 10 minutes (g/10 min) or equivalently decigrams per minute (dg/min).

Examples 1-8, Comparative Examples 1-2

Table 1 illustrates the invention in examples 1a-1b through 8a-3b, with comparative examples Comp 1 and Comp 2a-2c. Each "a" row illustrates a first polyethylene component and each "b" row illustrates a second polyethylene component. In Comp 2, the "c" row indicates a third polyethylene component. The column "Δ density" provides the difference in density of the two components for each illustrated blend. In Comp 2, the difference in density is the difference between components 2a and 2c. Comp 1 illustrates a comparative single polyethylene component within the density and melt index range typical for injection molding compositions. Comp 2 illustrates a comparative blend where the density difference is less than 0.037 g/cm³ but the blend melt index and density are the same as Example 1.

The polyethylene resins in Table 1 were prepared generally in accordance with the examples in U.S. Pat. No. 5,382,631, except where noted. A zirconocene activated with alumoxane on a silica support, 12 wt % methylalumoxane and 3.5 wt % zirconium, was used as polymerization catalyst in a gas phase reactor operated at about 185° F. (85° C.), with a gas phase consisting of 70 vol % ethylene, 0.5-2.0 vol % hexene, 200-800 parts per million hydrogen, with remainder being nitrogen. From about 50 to 75 pounds (22.6 to 33.9 kg) per hour were produced in each polymerization run.

ESCR values in Table 1 given as ranges indicate that the sample failure occurred at an undetermined time between the times shown. The ESCR value for blend 6a/6b indicates that the sample was intact when testing was stopped at 605 hrs.

Comparative Examples 1 and 2 have the same density as Example 1, and the same or comparable melt index, but show poor ESCR performance (4.5 hrs. versus 78.5-143 hrs.).

TABLE 1

| Example | Wt % | Melt Index $I_{2.16}$ (g/10 min) | Density (g/cm³) | Mw/Mn | Δ density (g/cm³) | ESCR, $F_{50}$ (hr) |
|---|---|---|---|---|---|---|
| 1a | 30.6 | 0.46 | 0.911 | 2.50 | | |
| 1b | 69.4 | 56.6 | 0.970 | 3.8 | | |
| 1a/1b Blend | 100 | 6.8 | 0.952 | | 0.059 | 78.8-143 |
| 2a | 27.2 | 0.46 | 0.911 | 2.50 | | |
| 2b | 72.8 | 56.6 | 0.970 | 3.8 | | |
| 2a/2b Blend | 100 | 7.5 | 0.954 | | 0.059 | 69.5 |
| 3a | 25.5 | 0.46 | 0.911 | 2.50 | | |
| 3b | 74.5 | 56.6 | 0.970 | 3.8 | | |
| 3a/3b Blend | 100 | 8.6 | 0.955 | | 0.059 | 6.5-23.5 |
| 4a | 23.8 | 0.46 | 0.911 | 2.50 | | |
| 4b | 76.2 | 56.6 | 0.970 | 3.8 | | |
| 4a/4b Blend | 100 | 9.3 | 0.956 | | 0.059 | 6.5-23.5 |
| 5a | 22.2 | 0.46 | 0.911 | 2.50 | | |
| 5b | 77.8 | 56.6 | 0.970 | 3.8 | | |
| 5a/5b Blend | 100 | 10.0 | 0.957 | | 0.059 | 5-6.5 |
| 6a | 30 | 0.45 | 0.919 | 2.59 | | |
| 6b | 70 | 56.6 | 0.970 | 3.8 | | |
| 6a/6b Blend | 100 | 4.8 | 0.955 | | 0.051 | >605 |
| 7a | 24 | 0.45 | 0.919 | 2.59 | | |
| 7b | 76 | 56.6 | 0.970 | 3.8 | | |
| 7a/7b Blend | 100 | 5.4 | 0.958 | | 0.051 | 60-78 |
| 8a | 35.5 | 0.86 | 0.919 | 2.43 | | |
| 8b | 64.5 | 56.6 | 0.970 | 3.8 | | |
| 8a/8b Blend | 100 | 7.0 | 0.952 | | 0.051 | 21-39 |
| Comp 1* | 100 | 6.5 | 0.952 | 3.6 | | 4.5 |
| Comp 2a | 29 | 3.0 | 0.935 | 2.82 | | |
| Comp 2b | 34 | 3.0 | 0.947 | 2.87 | | |
| Comp 2c | 37 | 56.6 | 0.970 | 3.8 | | |
| Comp 2a/2b/2c Blend | 100 | 6.8 | 0.952 | | 0.035 | 4.5 |

*Commercial HDPE for injection molding (HD6706, ExxonMobil Chemical Company)

Table 2 illustrates certain embodiments of the compositions described herein with examples 9a-9b through 11a-11b with comparative examples 3 and 4. Each "a" row illustrates a first polyethylene component and each "b" row illustrates a second polyethylene component. Comp 3 and Comp 4 illustrate comparative single polyethylene component compositions exhibiting density and melt index values typical for injection molding compositions.

The compositions listed in Table 2 were prepared by the same method as the compositions listed in Table 1.

TABLE 2

| Example | Wt % | MI (g/10 min) | Density (g/cm³) | ESCR (hr) | Pail Drop (ft/m) | Spiral Flow (in./cm) |
|---|---|---|---|---|---|---|
| 9a | 50 | 0.7 | 0.934 | | | |
| 9b | 50 | 235.0 | 0.972 | | | |
| 9a/9b Blend | 100 | 4.8 | 0.953 | 265 | 9.1 (2.77) | 25.6 (65.02) |
| 10a | 43 | 0.7 | 0.934 | | | |
| 10b | 57 | 235.0 | 0.972 | | | |
| 10a/10b Blend | 100 | 6.6 | 0.956 | 34 | 7.4 (2.25) | 29 (73.66) |
| 11a | 65 | 235.0 | 0.972 | | | |
| 11b | 35 | 0.7 | 0.918 | | | |
| 11a/11b Blend | 100 | 10.3 | 0.951 | 770 | 7.8 (2.37) | 33.8 (85.85) |
| Comp 3 | 100 | 4.3 | 0.951 | 14 | 6.7 (2.04) | 21.7 (55.14) |
| Comp 4 | 100 | 6.8 | 0.953 | 7 | 6.2 (1.88) | 25.3 (64.26) |

FIG. 1 is a plot of the pail drop and spiral flow values reported in Table 2. The vertical axis represents pail drop while the horizontal axis represents spiral flow. There is a clear difference between the trendline for the data intercept points of the compositions described herein (Line A) and the trendline for the data intercept points of the comparative examples (Line B). The trendline for the compositions described herein is relatively higher on the vertical axis than the trendline for the comparative compositions. Specifically, it is seen that the y intercept for the line of the compositions described herein is about 12 feet (3.65 m) while the y intercept for the line of the comparative compositions is below 9 feet (2.74 m). Moreover, the slope of each line is similar. The slope of Line A is −0.142 and the slope of Line B is −0.108. Therefore, an improved balance of toughness versus processability properties, as compared to conventional polyethylene compositions, is demonstrated. In certain embodiments depicted in FIG. 1, the compositions described herein and the articles produced therefrom, exhibit a balance of toughness and processability defined by pail drop values of at least 7 feet (2.13 m) and spiral flow values of at least 35 inches (88.9 cm). In other embodiments, the compositions described herein and the articles produced therefrom, exhibit a balance of toughness and processability defined by pail drop values of at least 8 feet (2.43 m) and spiral flow values of at least 30 inches (76.2 cm). In additional embodiments, the compositions described herein and the articles produced therefrom, exhibit a balance of toughness and processability defined by pail drop values of at least 9 feet (2.74 m) and spiral flow values of at least 25 inches (65.3 cm). In still other embodiments, the compositions described herein and the articles produced therefrom, exhibit a balance of toughness and processability defined by pail drop values of at least 10 feet (3.04 m) and spiral flow values of at least 15 inches (38.1 cm). In additional embodiments, the compositions described herein and the articles produced therefrom, exhibit a balance of toughness and processability defined by pail drop values of at least 11 feet (3.35 m) and spiral flow values of at least 10 inches (25.4 cm).

With reference to FIG. 1, Line C represents pail drop values and spiral flow values that may be obtained for other embodiments of the compositions described herein. In certain embodiments depicted by Line C in FIG. 1, the compositions described herein and the articles produced therefrom, exhibit a balance of toughness and processability defined by pail drop values of at least 7 feet (2.13 m) and spiral flow values of at least 30 inches (76.2 cm). In other embodiments, the compositions described herein and the articles produced therefrom, exhibit a balance of toughness and processability defined by pail drop values of at least 8 feet (2.43 m) and spiral flow values of at least 20 inches (50.8 cm). In additional embodiments, the compositions described herein and the articles produced therefrom, exhibit a balance of toughness and processability defined by pail drop values of at least 9 feet (2.74 m) and spiral flow values of at least 15 inches (38.1 cm). In still other embodiments, the compositions described herein and the articles produced therefrom, exhibit a balance of toughness and processability defined by pail drop values of at least 10 feet (3.04 m) and spiral flow values of at least 5 inches (12.7 cm).

Various tradenames used herein are indicated by a ™ symbol, indicating that the names may be protected by certain trademark rights. Some such names may also be registered trademarks in various jurisdictions.

All patents, test procedures, and other documents cited herein, including priority documents, are fully incorporated by reference to the extent such disclosure is not inconsistent with this invention and for all jurisdictions in which such incorporation is permitted.

What is claimed is:

1. An injection molded article comprising a polyethylene composition comprising:
   (a) a first polyethylene having a melt index of 0.1 to 3.0 g/10 min and a density of from 0.905 to 0.938 g/cm$^3$, wherein the first polyethylene is a metallocene-catalyzed polyethylene having an Mw/Mn ratio of from 1.4 to 4.0 produced in a gas phase reactor; and
   (b) a second polyethylene having a melt index of 10 to 500 g/10 mm and a density of 0.945 to 0.975 g/cm$^3$, wherein the composition has a density of from 0.920 to 0.973 g/cm$^3$ and a melt index of 2 to 200 g/10 mm, and wherein the density of the second polyethylene is from 0.037 to 0.062 g/cm$^3$ greater than the density of the first polyethylene.

2. The article of claim 1, wherein at least one of the first and second polyethylenes is a metallocene-catalyzed polyethylene.

3. The article of claim 1, wherein the first and second polyethylenes are metallocene-catalyzed polyethylenes.

4. The article of claim 2, wherein the metallocene-catalyzed polyethylene has an Mw/Mn ratio of from 1.4 to 4.0.

5. The article of claim 1, wherein the first polyethylene has a density of from 0.910 to 0.935 g/cm$^3$.

6. The article of claim 1, wherein the second polyethylene has a density of from 0.950 to 0.972 g/cm$^3$.

7. The article of claim 1, wherein the second polyethylene has a density of from 0.955 to 0.970 g/cm$^3$.

8. The article of claim 1, wherein the composition has a density of from 0.930 to 0.970 g/cm$^3$.

9. The article of claim 1, wherein the composition has a density of from 0.940 to 0.965 g/cm$^3$.

10. The article of claim 1, wherein the composition has a density of from 0.950 to 0.960 g/cm$^3$.

11. The article of claim 1, wherein the density of the second polyethylene is from 0.038 to 0.060 g/cm$^3$ greater than the density of the first polyethylene.

12. The article of claim 1, wherein the composition has a melt index $I_{2.16}$ of from 4 to 30 g/10 mm.

13. The article of claim 1, wherein the blend comprises 80% to 20% by weight of the first polyethylene and 20% to 80% by weight of the second polyethylene, based on the total weight of the first and second polyethylenes.

14. The article of claim 1, wherein the blend comprises 70% to 30% by weight of the first polyethylene and 30% to 70% by weight of the second polyethylene, based on the total weight of the first and second polyethylenes.

15. The article of claim 1, wherein the blend comprises 60% to 40% by weight of the first polyethylene and 40% to 60% by weight of the second polyethylene, based on the total weight of the first and second polyethylenes.

16. The article of claim 1, wherein the blend consists essentially of the first and second polyethylenes.

17. The article of claim 1, wherein at least one of the first and second polyethylenes comprises a blend of two or more polyethylene resins.

18. The article of claim 1, wherein the polyethylene is produced in a gas phase reactor process at a temperature of from 40 to 120° C.

19. The article of claim 1, wherein the gas phase reactor operates with from 200 to 800 parts per million of hydrogen in the reactor.

20. The article of claim 1, wherein the metallocene is a zirconocene.

21. The article of claim 1, wherein the metallocene is activated with alumoxane.

* * * * *